UNITED STATES PATENT OFFICE 1,986,420

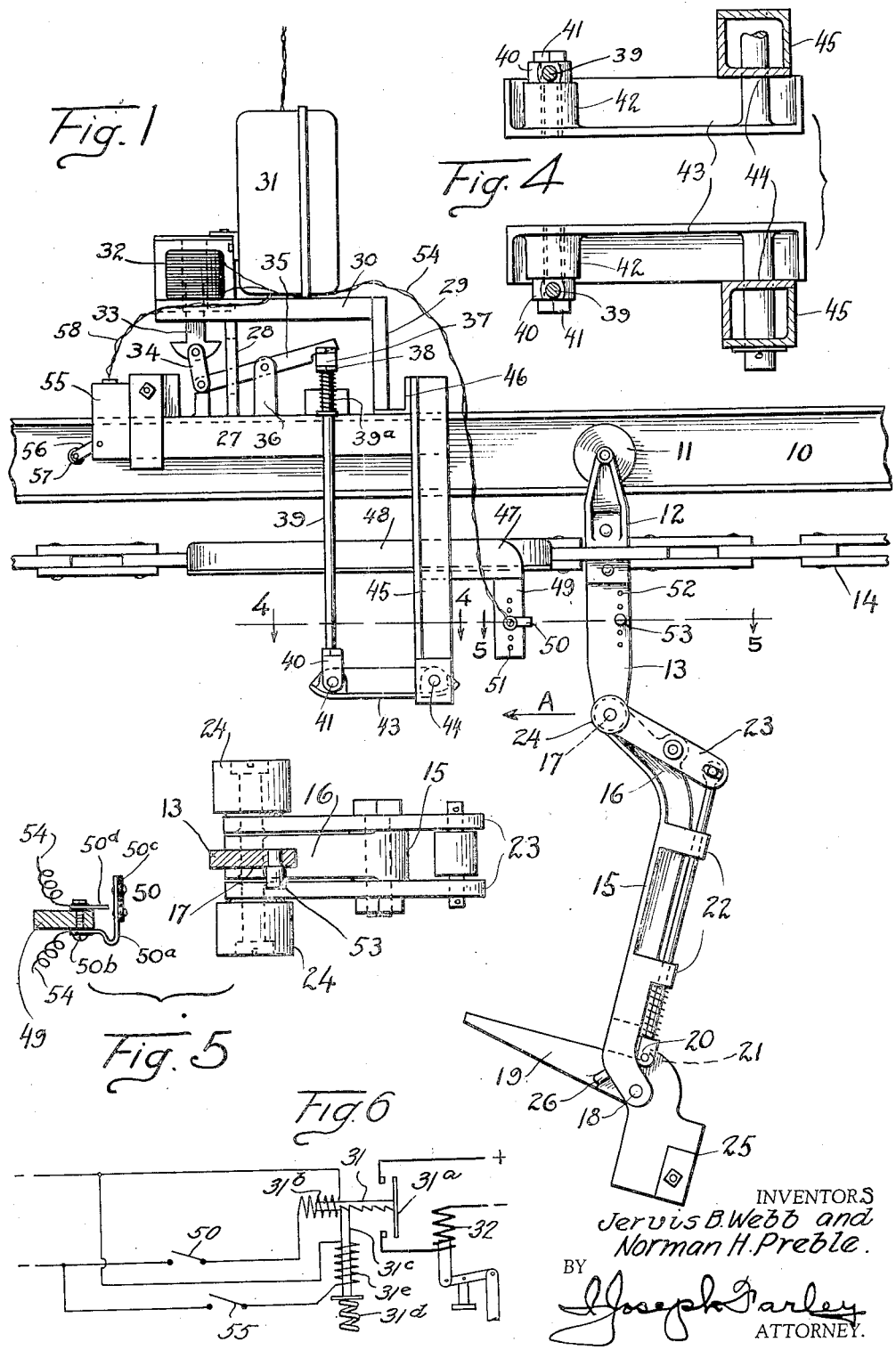

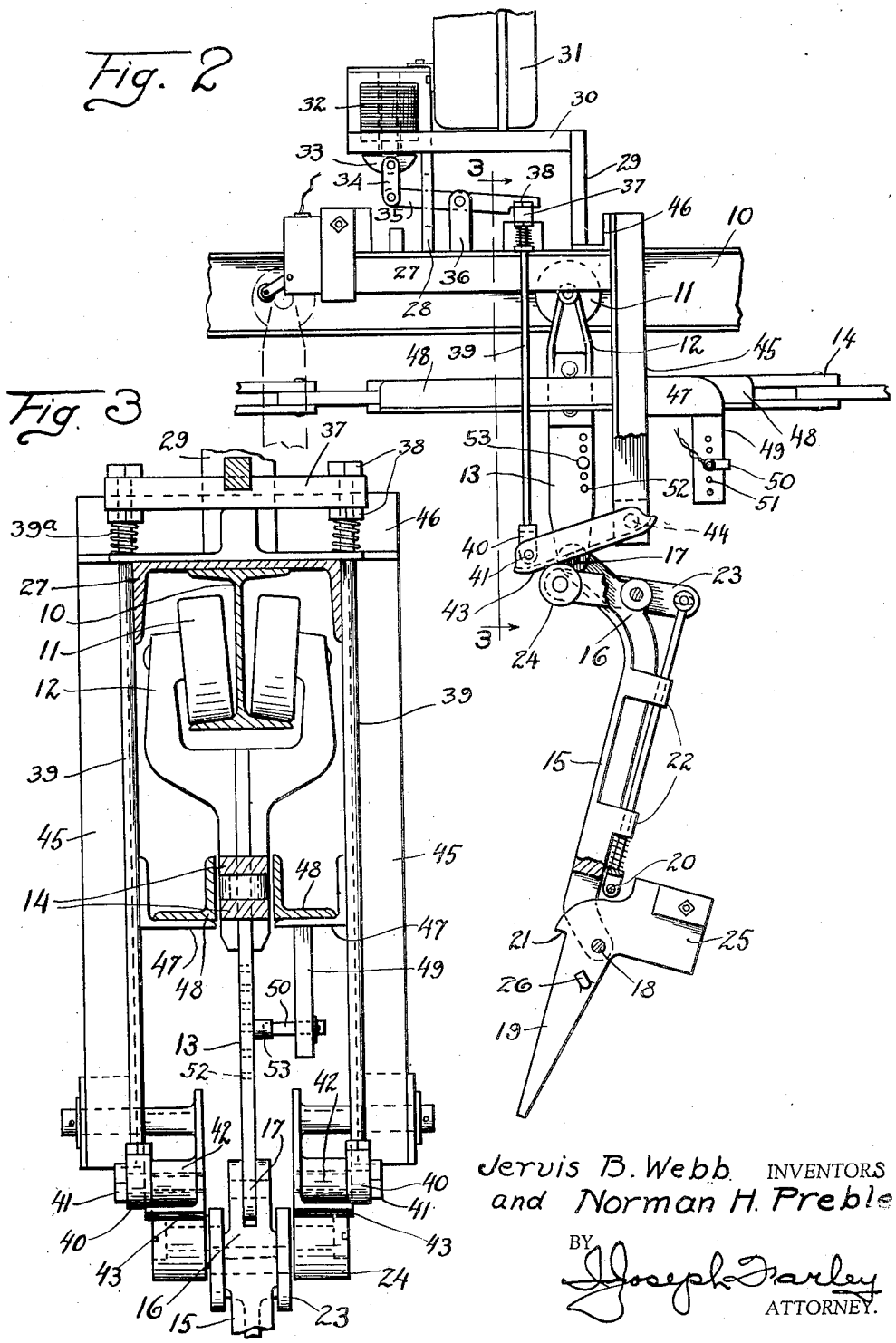

SELECTIVE CONVEYER SYSTEM

Jervis B. Webb, Royal Oak, and Norman H. Preble, Grosse Pointe, Mich.

Application November 25, 1931, Serial No. 577,302

8 Claims. (Cl. 198—38)

This invention relates to conveyer systems of the type employed for transporting materials about manufacturing or other establishments.

In the use of such systems it is sometimes highly desirable to remove articles at certain designated places or stations from the conveyer line. With conveyer systems as heretofore generally constructed for the transporting of articles of merchandise, and particularly for transporting such articles about a manufacturing plant in the course of performing various operations either on the articles being transported or for the purpose of delivering the articles to various stations to have manufacturing operations performed upon them, or to deliver them to their places of assembly to be united to form the product in the course of manufacture, it has been the usual practice to remove articles manually from the article carrying devices with which the conveyer system is equipped. The principal object of the present invention is to provide means whereby the articles being transported may be automatically released from the conveyer line when such articles have reached their intended destination.

Another object of the present invention is to provide a new and improved construction whereby a conveyer system having a plurality of article carrying devices and which system is employed for carrying articles intended to be delivered to different points or stations along the conveyer's line of travel and whereby such article carrying devices are equipped with means for selectively causing the articles carried thereby to be automatically discharged at any particular one of a plurality of different points or stations along the line.

A further object of the invention is to provide a new and improved construction of an article carrying device for a conveyer system which may be automatically tripped in its travel to discharge an article carried thereby.

Another object of the invention is to provide an automatically actuated article carrier and discharge with which may be combined means for causing it to be operated to discharge an article carried thereby at different points along a conveyer line in accordance with the setting of one or more adjustable members adapted to be set to different positions in accordance with the particularly designated station along the conveyer line at which the articles are to be discharged.

A further object is to provide a new and improved conveyer system in which is included automatic means for discharging articles carried by the conveyer at different points along the conveyer's line of travel, and to employ a plurality of cooperating adjustable members adapted to cooperate with one another so that articles carried by the conveyer may be selectively discharged at any one of a large number of different stations, the number of stations at which such selective discharge may be effected being limited only by the number of permutations or changes to which the adjustable devices may be set.

Another object is to provide a new and improved construction whereby the means for causing the automatic discharge of articles carried by the article carrying device includes a part located in axial alignment with the pivotal connection of said device to its supporting trolley so that said part and the automatic discharge means will always be in proper operative position irrespective of variations in the relative position of the article carrying device to said trolley.

Considered in its more specific aspects certain features of the invention reside in the provision of electrically operated controls capable of being actuated by a relatively sensitive switch or similar members, the actuation of which may be effected by the travel of the conveyer without the exertion of much force.

The above and other objects of the invention will appear more fully from the following more detailed description and by reference to the accompanying drawings wherein a satisfactory commercial embodiment of the invention has been selected merely as illustrative for the purpose of the present disclosure and, wherein, Fig. 1 is a side elevation of a portion of a conveyer line constructed in accordance with the principles of this invention and showing an article carrying device in operative position approaching a discharge station along the conveyer's line of travel; Fig. 2 is a view similar to Fig. 1, showing the manner in which the article carrying device has been automatically actuated at such station to discharge its load; Fig. 3 is a section of the line 3—3 of Fig. 2, and Figs. 4 and 5 are sections on the lines 4—4 and 5—5 respectively of Fig. 1, and Fig. 6 is a diagrammatic view of the electrical connections.

As shown in Figs. 1 and 3 of the drawings the numeral 10 indicates the load carrying track of the conveyer system which may be of any suitable or well-known construction but which is shown in the drawings as an I-beam. Supported for movement along the track 10 by the trolley wheel 11 is a bracket indicated generally by the reference character 12. The bracket 12 has a depending portion or stem 13 which passes through and is engaged by a link of the conveyer chain 14. The chain 14 is of the usual endless type and is actuated by any suitable driving means to cause the trolleys to be propelled along the track 10 in the direction of the arrow, A, in Fig. 1. Carried by the lower end of the depending stem 13 of the trolley is an article carrying hook, indicated generally by reference character 15. The article carrier 15 comprises a bracket 16 which at its upper end is pivotally connected, as at 17, with the lower end of the stem 13. Carried by the lower end of the bracket 16 and pivotally secured thereto, as at 18, is an article engaging member or hook 19. The hook 19 is adapted to be held in a position substantially at right angles to the bracket 16 by the engagement of a spring pressed latch 20 with a notch or shoulder 21 with which the hook 19 is provided. The latch 20 is slidably mounted in a pair of bearing lugs 22 which project laterally from the bracket 16 and at its upper end the latch is pivotally connected to one end of a latch operating lever 23, the other end of which has mounted thereon a roller 24 for a purpose presently to be described. The hook 19 is extended beyond the pivot 18 to form a depending counter weighted portion 25, which counter weight serves normally to hold the hook in a position perpendicular to the bracket 16, as shown in Fig. 1, and in position to be engaged by the spring pressed latch 20. The hook 19 is provided with a laterally projecting lug 26 adapted to co-operate with the bracket 16 and form a stop to limit the rotation of the hook by its counterweighted portion 25 to a position such that engagement of the latch 20 with the shoulder 21 will be assured.

Suitably supported on the sub-frame above the track 10 is an operating mechanism for controlling the automatic actuation of the hook 19. The frame work which supports this mechanism may be of any suitable construction; as shown it consists of a channel iron member 27, the web of which rests upon the top web of the track 10 and is suitably secured to said track as, for example, by welding. Mounted upon a pair of brackets, or uprights, 28, 29 and secured at their lower ends to the channel iron member 27, is a small platform, 30, upon which is supported a magnetic switch 31 and a solenoid 32. The armature 33 of the solenoid is connected by means of a link 34 with one end of the lever 35, the lever 35 is pivotally supported intermediate at its ends upon a fork shaped bracket 36, the latter also being secured to the web of the channel member 27. At its other end the lever 35 rests upon a cross-bar 37 approximately at the center of the latter. Secured to each end of the cross bar 37 by any suitable means such as the nuts 38 is the top end of an actuating rod 39. At its lower end the rod 39 has secured thereto an apertured bearing head 40 through which passes a bolt 41. Each bolt 41 is screwed into a boss 42 preferably formed integral with, and at one end of, a section of an adjustable cam track 43. At its other end, the track 43 is pivotally connected, as at 44, to the lower end of a depending bracket 45, the latter being secured by an angle bracket 46 to the web of the channel iron 27.

Secured to the sides of the brackets 45 at a point substantially in alignment with the chain 14 is a pair of angle iron members 47 each of which carries another similar angle iron member 48 spaced from each other a distance but slightly greater than the width of the chain 14, the members 48 serving to guide the chain 14 in its travel past the discharge station and to prevent undue lateral movement thereof at this point. One of the members 47 has at one end thereof a depending post 49, to which is secured a small switch 50. The post 49 is preferably provided with a plurality of holes 51, to permit the adjustment of said switch 50 to different positions. The switch 50 projects laterally from the side of the post 49 towards the path of movement of the depending stem 13 of the trolley 12. This stem 13 is in turn provided with a plurality of spaced holes 52 in any of which is adapted to be secured a small actuating button or plug 53 and which is adapted to engage with the switch 50 to actuate same as the trolley 12 in its travel passes the post 49. The switch 50 is connected by lead wires 54 with the magnetic switch 31 which in turn is in circuit with the solenoid 32. Mounted on the end of the web 27, removed from the brackets 45, is a small limit switch 55 which may be of any suitable or well known construction. This switch is provided with a small pivotally mounted actuating arm, or lever, 56, having at the free end thereof a small roller 57 which roller projects into the path of movement of the trolley 12 to be actuated thereby when the trolley passes said switch. The switch 50 may be of any suitable construction. It is shown in Fig. 5, however, as consisting of a spring contact 50a which at one end is secured by the terminal screw 50b to the post 49 and which at its other end has secured to it a small insulating plate 50c. The plate 50c projects into the path of movement of the plug 53 and when the plug engages with the insulating block 50c the spring contact 50a will be moved into engagement with a second contact 50d, thereby closing the circuit in the lead or terminal wires 54 and causing the magnetic switch 31 to be energized. The magnetic switch 31 may be of any suitable construction and may, for example, include a magnetically operated switch arm 31a for closing a circuit to the solenoid coil 32. When the switch 50 is closed a circuit is completed from a low voltage source of current to a coil 31b which actuates the switch member 31a and causes the circuit from the higher voltage line to be completed to the solenoid coil 32. The switch 31a is held in closed position by means of a ratchet pawl 31 which is normally urged by a spring 31d into engagement with ratchet teeth formed in the armature post in the switch 31a. When the switch 55 is closed, current passes to the coil 31e, and by the solenoid action thereof withdraws the pawl 31c from engagement with the armature post of the switch 31a, the switch 31a either dropping by its own weight out of engagement with its switch contacts or being pulled out of such engagement by a small spring not shown.

The manner in which the device operates is as follows: Let it be assumed that the conveyer is moving in the direction of the arrow A in Fig. 1 of the drawing, i. e. from right to left and that it is desired to discharge an article carried by the conveyer hook 19 at a station located below the channeled bracket 47. The depending post 49 of the bracket 47 has its switch 50 arranged at a height such as to be in alignment with the plug 53 similarly adjusted on the stem 13 of the trolley 12. When the plug 53 contacts with the insulating plate 50c of the switch 50, the switch contacts will be closed in the manner hereinbefore described, thus causing the magnetic switch 31 to be energized for closing the circuit leading to the solenoid 32. The coil on the solenoid 32 being energized, the armature 33 of the solenoid will be pulled upwardly, in accordance with the usual operation of such devices. As the armature 33 is pulled upwardly it will cause the lever 35 to be rotated upon its pivotal mounting in the bracket 36 from the position shown in Fig. 1 to that shown in Fig. 2. The outer free end of the lever 35 will be pushed downwardly, its motion being communicated to the cross bar 37, and as the cross bar 37 moves downwardly, it will cause the rods 39 to be moved down against the action of the springs 39a. The downward movement of the rods 39 is communicated to the small pivotally mounted cam track sections 43, thus causing said track sections to be projected into the path of movement of the rollers 24.

The location of the switch 50, it will be noted, is slightly in advance of the cam tracks 43, so that after the conveyer in its travel causes the switch 50 to be closed and as a result the tracks 43 to be moved downwardly as just described, the tracks will be in their lowered position by the time the conveyer in its travel brings the rollers 24 to a point below these tracks. As the conveyer continues in its travel, the tracks 43 now being in the position shown in Fig. 2 form inclined cam surfaces against which the rollers 24 engage, and as the conveyer continues moving, the cam action of the tracks will cause the levers 23 to be rotated from the position shown in Fig. 1 to that shown in Fig. 2. The ends of the levers 23 opposite to the rollers 24 will, therefore, be moved upwardly, thus causing the latch 20 to be pulled up out of engagement with the shoulder 21. The weight of the articles carried by the hook 19 will cause the hook to be rotated against the action of its counterweight portion 25 from a position perpendicular to the bracket 16 to a position in parallelism therewith as shown in Fig. 2. The articles will then be discharged off the hook.

As the conveyer continues in its travel the trolley 12 will engage with the roller 57 of the end of the lever 56 of the limit switch 55. This switch being connected by the lead wires 58 with the magnetic switch 31, will cause the magnetic switch to be opened, breaking the circuit to the solenoid 32. The breaking of the circuit to the solenoid permits the springs 39a to restore the tracks 43 to their substantially horizontal position, as shown in Fig. 1. After the rollers 24 have passed out of engagement with the tracks 43, the latch 20 will be restored to its lowered position where it will again be in position to engage with the shoulder 21. The release of the articles from the hook 19 will permit the counterweight portion 25 of the hook to bring the hook to a position where the shoulder 21 will engage with the latch 20 to hold the hook again in its operative position.

As will be readily understood if it is desired to use the conveyer for transporting many different articles and for articles upon which different operations are to be performed at different stations, some of the trolleys will have the plug 53 located in one position along the stem 13, while on other trolleys the plugs will be in a different location, and of course, the switches 50 will be adjusted at certain designated stations along the conveyer's line of travel to cause the articles to be discharged at each particular station in accordance with the settings of the plug 53 and the switch 50 for each respective trolley and station.

While we have shown but a single switch and plug for the station and trolley respectively, it will, of course, be understood that two or more plugs and switches may be employed, and various permutations of the arrangements of the locations of the plugs and switches may be resorted to whenever it is desired to have a large number of different stations at which the goods are to be selectively discharged.

It will be seen from the foregoing that the principles of the present invention are capable of wide applicability of use. It will be apparent that different means may be employed in connection with the invention, to receive the articles as they are discharged from the hooks 19. They may, for example, be dropped into trays, bins or other containers or deposited on endless conveyer belts, or, with proper mechanical contrivances, delivered on to another conveyer line. The employment of a mechanical switch and solenoid by means of the small switch 50 located in advance of the movable cam tracks 43 insures that said cam tracks will be brought to a position to engage the rollers 24, thereby to trip the latch 20, well in advance of the point where the rollers 24 move into alignment with said tracks 43. The employment of the limit switch 55 insures that the tracks 43 will be held in their operative position for a sufficient length of time to cause the latch 20 to be released. The employment of the solenoid with the springs 39a, the latter serving to normally hold the cam tracks 43 in an inoperative position, insures that any trolleys from which the goods are not to be discharged at any particular station will pass freely by the cam tracks of such station without the latch for the hook 19 of such trolley being disengaged. The arrangement and construction of the small switch 50, in combination with a magnetic switch, enables the parts of the small switch to be so constructed as to require but a very small amount of force to cause said switch to be closed.

Although the latch operating lever 23 is pivotally mounted upon the article carrying hook 15 and the latter is in turn pivotally supported at 17 from the trolley stem 13, the roller 24 carried by the lever 23 will always be in position to engage with the track 43 when the latter is moved to its lowered position. This is effected by locating the roller 24 so that its axis will be in alignment with the axis of the pin 17 and so that the distance from said axis to the pivotal connection of the lever 23 to the hook 15 will be equal to the distance of said connection to the axis of the roller.

It will be understood that, although the invention has been shown in connection with a double trolley and track of I-beam configuration, that such illustration is merely by way of example, and that as to such constructional details, as well as the structural details of the article carrying hook and the mounting and arrangement of the various switches and solenoid, such parts are merely shown as satisfactory examples of construction and not as limiting the invention to such details. It will, therefore, be understood that many changes, variations, and modifications may be resorted to without departing from the principles of the invention.

We claim:

1. In a conveyer system, a load carrying trolley, and means for propelling the same along said conveyer, said trolley including an article carrying member movable to and from an operative load carrying position, latching means for holding said member normally in said load-carrying position including a latch actuating member carried by the trolley, and a cam track movable to and from an operative position in the path of the latch actuating member and of such length as to hold the latch released for a predetermined time during travel of the trolley therepast to cause said article carrying member to discharge an article carried thereby, and allow the load a predetermined time to clear the trolley and means for returning said member to said latched load-carrying position.

2. In a conveyer system, a load carrying trolley, and means for propelling the same along said conveyer, said trolley including an article carrying member movable to and from an operative article carrying position, means for holding said member normally in said position gravity actuated means for returning said member to said position, cam tracks movable to and from an operative position in which said last named means will be actuated to cause said article carrying member to discharge the article carried thereby, and means for moving said cam tracks to and from their operative position.

3. In a conveyer system, a load carrying trolley and means for propelling the same along said conveyer, said trolley including an article carrying member movable to and from an operative article carrying position, means for holding said member normally in said position and for returning the same thereto, a cam track movable to and from an operative position in which said last named means will be actuated to cause said article carrying member to discharge the article carried thereby, said cam track being of such length as to hold the article carrying member released for a predetermined time to allow a load to clear the trolley when discharged, electrical means for actuating said cam track to and holding the same in operative position, including a switch actuable by the trolley and located in advance of the cam track, and means for returning the cam track to nonoperative position including another switch actuable by the trolley and located beyond the cam track.

4. In a conveyer system, a load carrying trolley, and means for propelling the same along said conveyer, said trolley including an article carrying member movable to and from an operative article carrying position, means for holding said member normally in said position, cam tracks movable to and from an operative position in which said last named means will be actuated to cause said article carrying member to discharge the article carried thereby, means, including an electromagnetic device, for moving said cam tracks to and from their operative positions and separate switch means actuable in response to movement of the trolley for causing each cam track to be moved to operative and non-operative position, one switch being located in advance of each cam track and another beyond the same in the direction of trolley movement.

5. In a conveyer system, a load carrying trolley, and means for propelling the same along said conveyer, said trolley including an article carrying member movable to and from an operative article carrying position, means for holding said member normally in said position, cam tracks movable to and from an operative position in which said last named means will be actuated to cause said article carrying member to discharge the article carried thereby, and means for moving said cam tracks to and from their operative position, including a plurality of switch members and actuating means therefor, said actuating means being carried by said trolley and the switch members being disposed adjacent to the path of travel of said trolley and arranged to be operated by the actuating members as the trolley travels along the conveyer line, certain switch members for moving the cam tracks to operative position being located entirely in advance of the cam tracks, and other switch members for moving the tracks from operative position being located beyond the cam tracks in the direction of trolley movement.

6. The combination of a conveyer including an article carrying trolley, an article carrying member mounted on said trolley for movement to and from an article carrying position, means for normally holding said member in said position, cam means located at a predetermined point along the conveyer's line of travel, means for normally holding said cam means in an inoperative position, means located in advance of said cam means to cause the latter to be actuated to an operative position thereby to cause said article carrying member to be moved from its article carrying position, and means to the rear of said cam means to cause the latter to be restored in its inoperative position.

7. In a conveyer system, a load carrying trolley, an article carrying device pivotally secured to said trolley, means including a cam track movable into and out of the path of movement of said device to cause it to release articles carried thereby, said means also including a member carried by said device and maintained in the same vertical position relatively to said track irrespective of movement of said device on its pivotal mounting.

8. In a conveyer system, a load carrying trolley, an article carrying device pivotally mounted on said trolley, said device including means for permitting the discharge therefrom of articles carried thereby and means for actuating said first named means, including a cam track located adjacent to the path of movement of said trolley, a pivoted actuating lever carried by said article carrying device and a roller for engaging said cam track carried by said lever and having its axis of rotation located in alignment with the axis of the pivotal connection of said device to said trolley, whereby the vertical position of said roller relatively to said cam track will be unaffected by swinging movement of said article carrying device on its pivotal connection to said trolley.

JERVIS B. WEBB.
NORMAN H. PREBLE.